United States Patent
Nickel et al.

(10) Patent No.: US 9,873,404 B2
(45) Date of Patent: Jan. 23, 2018

(54) SUPPORT STRUCTURE FOR SUPPORTING EXTERNAL PANEL COMPONENTS OF A VEHICLE

(71) Applicant: GM GLOBAL TECHNOLOGY OPERATIONS LLC, Detroit, MI (US)

(72) Inventors: Marco Nickel, Ruesselsheim (DE); Martin Likar, Ruesselsheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/149,798

(22) Filed: May 9, 2016

(65) Prior Publication Data
US 2016/0325709 A1 Nov. 10, 2016

(30) Foreign Application Priority Data

May 8, 2015 (DE) .......................... 10 2015 005 896

(51) Int. Cl.
*B60R 21/34* (2011.01)
*B62D 25/08* (2006.01)

(52) U.S. Cl.
CPC ............ *B60R 21/34* (2013.01); *B62D 25/085* (2013.01); *B60R 2021/343* (2013.01)

(58) Field of Classification Search
CPC ......... B60R 19/12; B60R 19/52; B60R 21/34; B60R 21/343; B62D 25/08; B62D 25/084; B62D 25/085
USPC ............. 296/187.04, 187.09, 193.09, 193.11
See application file for complete search history.

(56) References Cited

U.S. PATENT DOCUMENTS

| | | |
|---|---|---|
| 5,865,500 A | 2/1999 | Sanada et al. |
| 7,988,225 B2 | 8/2011 | Goldsberry |
| 8,434,814 B2 * | 5/2013 | Hirano ................ B62D 25/084 296/193.09 |
| 9,227,584 B2 * | 1/2016 | Buenger ................ B60R 19/26 |
| 9,446,794 B2 | 9/2016 | Kobayashi |
| 2004/0007901 A1 | 1/2004 | Weik et al. |

(Continued)

FOREIGN PATENT DOCUMENTS

EP    EP-2374665 A1 *    10/2011   ............. B60K 11/04

OTHER PUBLICATIONS

German Patent Office, German Search Report for German Application No. 102015005896.7, dated Nov. 26, 2015.

(Continued)

*Primary Examiner* — Jason S Daniels
(74) *Attorney, Agent, or Firm* — Lorenz & Kopf, LLP

(57) ABSTRACT

A support structure for supporting panel components of a vehicle includes a deformable member with fastening points for connecting the support structure to the panel components, and one or more support members that are connected to the deformable member each with a free end. The support members can be fastened to one or more cross members of a body of the vehicle. The support structure can be used with a panel arrangement including one or more panel components for covering a portion of the vehicle. An intermediate member may be arranged between the panel components and the support structure, which during the shifting of the panel components in the direction of the support structure, interacts with the panel components and the support structure and thereby deforms the support structure.

14 Claims, 2 Drawing Sheets

(56) References Cited

U.S. PATENT DOCUMENTS

| | | | |
|---|---|---|---|
| 2004/0100127 A1* | 5/2004 | Saitou | B62D 25/084 |
| | | | 296/203.02 |
| 2005/0017520 A1* | 1/2005 | Evans | B60R 19/18 |
| | | | 293/120 |
| 2005/0275227 A1 | 12/2005 | Ahn | |
| 2008/0100073 A1* | 5/2008 | Mitsuyama | B62D 25/163 |
| | | | 293/132 |
| 2012/0019025 A1 | 1/2012 | Evans et al. | |
| 2012/0049799 A1* | 3/2012 | Terashima | B60K 1/04 |
| | | | 320/109 |
| 2012/0261205 A1* | 10/2012 | Iania | B62D 25/085 |
| | | | 180/274 |
| 2013/0134739 A1* | 5/2013 | Harris | B62D 25/085 |
| | | | 296/187.09 |
| 2016/0137230 A1* | 5/2016 | Taneda | B62D 25/085 |
| | | | 296/193.09 |

OTHER PUBLICATIONS

Great Britain Patent Office, Great Britain Search Report for Great Britain Application No. 1605841.4, dated Aug. 11, 2016.

* cited by examiner

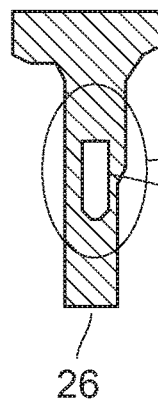
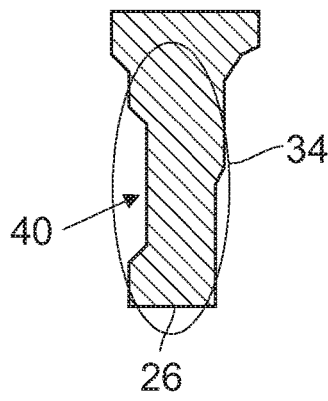
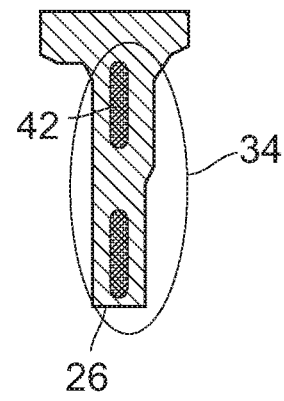
Fig. 3A          Fig. 3B          Fig. 3C
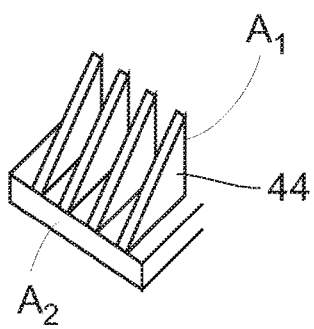
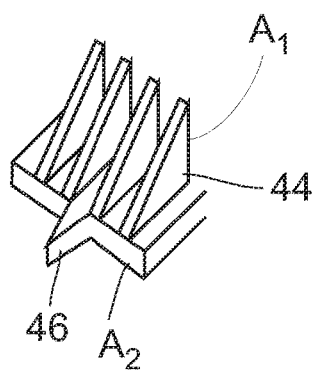
Fig. 4A          Fig. 4B

SUPPORT STRUCTURE FOR SUPPORTING EXTERNAL PANEL COMPONENTS OF A VEHICLE

CROSS-REFERENCE TO RELATED APPLICATION

This application claims priority to German Patent Application No. 102015005896.7, filed May 8, 2015, which is incorporated herein by reference in its entirety.

TECHNICAL FIELD

The present disclosure pertains to a support structure for supporting panel components of a vehicle. Panel components of a vehicle include among others the engine hood, the radiator grille with the marque badge as well as the bumper.

BACKGROUND

During the course of improving pedestrian protection, it is necessary to equip panel components with a certain deformability in order to reduce the loads for the pedestrian in the event of an impact. Through the deformation of the panel components, these absorb a part of the energy that is active during the impact by at least apart of this energy being converted into deformation energy. The loads of the pedestrian can consequently be minimized in that the deformability is increased. In other words, the softer and more resilient the panel components are, the more greatly reduced the loads for the pedestrian during the course of an impact. In this connection, the loads which during an impact act on the thigh or the hip of the pedestrian play a decisive role.

However, the panel components cannot be made softer indefinitely or their deformability be increased indefinitely, since they also have supporting functions for example for fog lamps and sensors. During the operation of the vehicle, they are sometimes additionally exposed to major loads for example as a consequence of vibrations or aerodynamic pressures. Furthermore, extraordinary loads can also occur for example by slamming the hood or when an animal jumps on the engine hood or a person sits on the engine hood or the vehicle grille or leans against the same. In these cases, it is undesirable that the panel components are deformed.

There is consequently a conflic between the deformability on the one hand and the stiffness of the panel components on the other hand. The present disclosure is not aimed at the deformation behavior in the event of a collision with another vehicle or a stationary object since the energy input in this case is incomparably greater. The deformation behavior as a consequence of such a collision will therefore be ignored in the following considerations.

SUMMARY

The present disclosure creates a support structure for supporting the panel components of a vehicle and a panel arrangement for covering the vehicle which on the one hand make it possible to select the deformability of the panel components so that the loads for pedestrians in the event of an impact do not exceed the maximum dimensions which are described by law and demanded by consumer protection organizations such as NCAP, but which at the same time provide adequate stiffness of the panel components.

According to an embodiment, the support structure for supporting panel components of a vehicle according to the present disclosure includes a deformable member or member with first fastening points for connecting the support structure to the panel components and to cross members of a body of the vehicle, and one or more support members that are connected to the deformable member with two fastening points, to which the support members on one or more cross members of the body of the vehicle can be fastened. Fastening points is to mean regions in which the support structure can be connected to the panel components or to the cross members, directly or indirectly via additional components. The selected formulation is not intended to restrict the form of a point in the geometrical sense.

In the installed state, the deformable member is for example connected to the bumper and the fender or the lateral structure of the vehicle. The deformable member is therefore approximately oriented horizontally in the installed state. The support member or portions point downwards with the distal end. There, the support members are connected for example to a cross member of the vehicle body. Here, the support member can run perpendicularly to the deformable member, In the event that only one support member is provided, the same meets the deformable member in the middle and in the installed states runs in the center of the vehicle. In this case, the support structure substantially has a T-shape.

Since in many cases the moments caused by a load are greatest in the center, the panel components have a particularly great deformability there so that the support member particularly effectively supports the panel components in the present embodiment. When the support member runs perpendicularly downwards from the deformable member, the forces that act during an impact of a pedestrian are particularly favorably absorbed by the support member since compared with support members that are inclined with respect to the deformable member the moments acting on the support member are kept low. Consequently, the wall thicknesses of the deformable member can be embodied smaller without unintentional deformations due to the events mentioned at the outset occurring because of this. The weight of the support structure according to the present disclosure can thus be kept low. Here, the support member is configured so that it is deformed as a consequence of a pedestrian impact so that the loads for the pedestrian do not exceed the maximum dimensions which are prescribed by law and demanded by consumer protection organizations such as NCAP. Consequently, it is possible with the support structure according to the present disclosure on the one hand to increase the deformability of the panel components, for example in order to save material and consequently weiLlit, on the other hand provide adequate stability so that the panel components are not unintentionally deformed.

The support structure includes an additional component which to date is not yet employed in automobile construction in this form. Here it is opportune to screw the support structure to the panel components and the cross member since because of this the support structure can be installed in the vehicle concerned only during the final assembly. Also conceivable would be welding the support structure to the cross member in the body-in-white, but which would be comparatively expensive and as a result of which the further assembly of the vehicle would be rendered more difficult.

It is opportune that the support member includes regions with reduced resistance moments. The regions with reduced resistance moments ensure that the support member in the event of an impact is initially deformed in the desired place. Thus, the deformation behavior of the support member can be controlled in order to prevent that during the deformation particularly much material is accumulated at a place and the support member is not deformed further or in an undesirable manner. In particular, it is prevented that the loads for the pedestrian increase to an impermissible dimension.

According to a further configuration, the deformable member includes regions with reduced resistance moments. Because of this it is possible to ensure a defined bending behavior in the event of an impact after the vertically running support member has been deformed. In this event, the axis, about which the deformable member is deformed during the impact, is approximately perpendicularly to the axis about which the support member is deformed. Consequently, this also makes a contribution for a defined deformation behavior in the event of an impact of a pedestrian.

In a further configuration, the support member and/or the deformable member includes tapers, holes and/or notches in the regions with reduced resistance moments. With tapers, holes or notches it is possible in a technically simple manner to equip the regions with a reduced resistance moment. In these regions, the support member has a reduced strength which is why it is more rapidly and more greatly deformed here than outside this region.

In addition to this, a further aspect of the present disclosure relates to a panel arrangement for covering a vehicle, including one or more panel components, a support structure according to any one of the previously described exemplary embodiments and an intermediate member that is arranged between the panel components and the support structure, which during the shifting of the panel components in the direction of the support structure interacts with the panel components and the support structure and thereby deforms the support structure. The advantages and technical effects that can be achieved with the panel arrangement corresponds to those that were discussed for the support structure according to the present disclosure.

In summary it is to be noted here that with the panel arrangement according to the present disclosure it is possible on the one hand to equip the panel components with a great deformability so that they can be configured in a more material-saving manner and thereby lighter in weight, as a result of which the loads that act on the pedestrian during an impact can also be kept low. On the other hand, the panel components can be provided with adequate stability so that these are deformed only during an impact of a pedestrian and not during the other events described at the outset. In addition, the intermediate member makes it possible to specifically transfer the shifting or the deformation of the panel arrangement to the support structure. It is thereby ensured that the support structure is first deformed in the desired place so that the deformation occurs in a controlled manner. This also makes a contribution to the pedestrian protection since it can thereby be ensured that the loads during the impact remain below the allowed dimension throughout the impact.

A further development of the panel arrangement is characterized in that the intermediate member during the shifting of the panel components in the direction of the support structure interacts with the regions with reduced resistance moments and thereby deforms the support structure. Because of the fact that the intermediate member during the shifting interacts with the regions with reduced resistance moments it is likewise achieved that the loads for the pedestrian during the impact do not exceed the maximum permissible values. In addition, the deformation is thereby also directed into the desired paths so that it occurs in a controlled manner.

In addition to this, the intermediate member includes a first portion facing the panel components and a second portion facing the support structure. The first portion is larger than the second portion. For example, the intermediate member can have an L-shape in cross section. As mentioned at the outset, bumper and radiator grille are included in the panel components. These are areal components, wherein in particular the bumpers can extend over the entire width of the vehicle. Because of the fact that in the event of an impact they interact with the second portion of the intermediate member, the forces acting between them are equally distributed. Because of this it is prevented that stress peaks develop which, locally limited, can result in no deformation or shifting of the panel components or such as is uncontrolled and harmful to the pedestrian. In addition to this, the pressure on the support structure caused through the forces that develop during the impact is increased because of the smaller second portion so that the same is more rapidly deformed. In this way it is possible to impart the panel components with adequate stiffness without the loads that act on the pedestrian during the impact exceed the maximum permissible dimension because of this.

It is opportune for the intermediate member to include a number of ribs. In this configuration, the intermediate member can be constructed relatively wide so that the panel components can interact with the intermediate member over a large region, however the ribs bring about that the weight of the intermediate member is not excessively increased.

In a further configuration, the ribs have a triangular shape in cross section. The ribs with the triangular shape can be embodied with a high resistance moment. Consequently, it is achieved that the forces which act during the impact of a pedestrian are securely transferred between the second and the first portion without stress peaks being caused in the ribs and the geometrical configuration of the ribs being rendered more complicated because of this. In addition, the ribs with the triangular shape can be produced in a relatively simple manner. In particular, in the case that the intermediate member is embodied as a casting, for example as die casting, the ribs do not generate any undercuts so that elaborate tool slides can be omitted. Nevertheless, the ribs can also have other cross sections with which a high resistance moment can be provided and undercuts can be avoided.

In addition to this, the intermediate member includes a protrusion which interacts with the notches or the holes of the regions with reduced resistance moments. The protrusion can taper into a point towards the free end in order to provide a centering effect. Alternatively, the intermediate member can have a U-shaped protrusion which at least partially encloses the taper. Here it can be practical that relative movements directed along the longitudinal axis of the support member between the intermediate member and the support member are made possible which can be realized for example by way of an elongated hole. Consequently, the protrusion can shift in the elongated hole within certain limits. The protrusion can be configured no that it interacts with the notches or the holes in particular even when the panel components are in their original position, that is no impact of a pedestrian has taken place. Alternatively, the protrusion can be configured so that it interacts with the notch or the holes only when the panel components shift as a consequence of an impact. In any case, the manner in which the intermediate member and the support structure interact is predetermined even when the impact deviates from the assumed course. The safety for pedestrians is thereby increased as a whole.

Here, the panel components include an engine hood, a radiator grille, a bumper and/or a marque badge. In various vehicles, the engine hood, the radiator grille and the marque badge are located at the front end of the vehicle. Since a vehicle in most cases by far is moved forward, the pedestrians usually come into contact with these panel components during an impact. Consequently, the panel arrangement according to the present disclosure makes a particularly high contribution to increasing the pedestrian safety in this configuration compared with panel components that are located at the rear of a vehicle.

It is opportune for the intermediate member to be arranged so that it interacts with the marque badge during the shifting of the panel components. In many cases, the radiator grille and the bumpers of the vehicles are produced from plastic that is relatively favorably deformable. The marque badge includes comparatively thick-walled and consequently relative hard metal or die cast components. In addition to this, the marque badges are usually located in the center of the vehicle, where for example the bumpers and the engine hood have the least stability. It is therefore opportune to let the marque badge interact with the intermediate member and consequently indirectly with the support structure since a largely deformation-free force transmission between the panel components and the support structure is thereby made possible. This has the advantage that the energy is removed only or almost exclusively by the support structure and not by the panel components.

Because of the geometry of the intermediate member, which is necessary for an optimal force transmission, a material accumulation in the intermediate member and in particular in the ribs occurs. As a consequence of the material accumulation, so-called sink marks develop during the cooling process which under aesthetic aspects are disadvantageous. Since in this arrangement the marque badge covers the intermediate member, the sink marks are not visible to the user.

In a further configuration of the panel arrangement according to the present disclosure, the intermediate member and the marque badge are combined into one component. Reducing the number of components reduces the production and tool costs and simplifies stockholding. In addition, the force flow within a component is better controllable than with two components, which in the event of an impact can shift relative to one another in an undesirable manner. For example, in the case that the intermediate member and the marque badge are realized as an injection molded part a great freedom of design is available. The necessary stiffnesses can also be provided with an injection molded part through suitable selection of the geometries, for example with ribs, an that a metal part that is expensive to produce is not required. However, it is also conceivable here to combine the intermediate member and other panel components, in particular the bumper, into a component. The previously described advantages equally apply to this configuration.

In addition to this, a further aspect of the present disclosure relates to a vehicle with a panel arrangement according to any one of the previously described embodiments. The advantages and technical effects which can be achieved with the panel arrangement correspond to those as were discussed for the support structure according to the present disclosure and the panel arrangement according to the present disclosure.

BRIEF DESCRIPTION OF THE DRAWINGS

The present disclosure will hereinafter be described in conjunction with the following drawing figures, wherein like numerals denote like elements.

FIGS. 3A-C show an exemplary embodiment each of a region with reduced resistance moment of the support member by way of a front view; and FIGS. 4A-B show an exemplary embodiment each of an intermediate member according to the present disclosure by way of a perspective representation.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
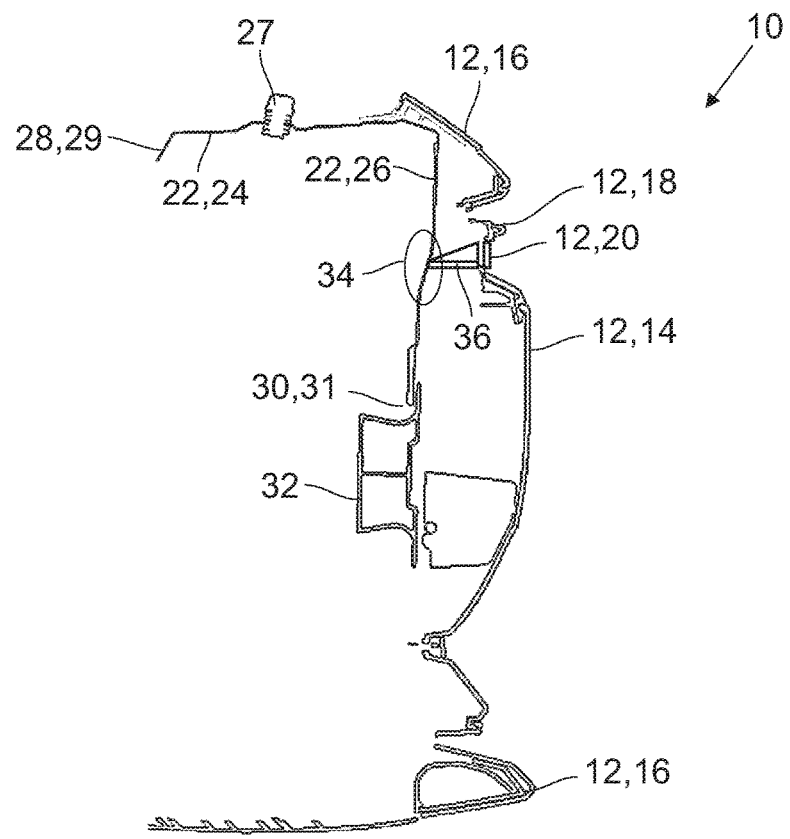
FIG. 1 shows an exemplary embodiment of a panel arrangement according to the present disclosure by way of a sectional representation.

In FIG. 1, an exemplary embodiment of a panel arrangement 10 according to the present disclosure is shown by way of a sectional representation. The panel arrangement 10 includes a number of panel components 12, in this case a bumper 14, an upper and a lower stiffening element 16 for the bumper 14, a radiator grille 18 as well as a marque badge 20. In FIG. 1, no engine hood is shown, but which can also be included among the panel components 12. In addition, the panel arrangement 10 includes a support structure 22, which includes a deformable member 24 and a support member 26 running perpendicularly thereto see also FIG. 2).

Figure 2:
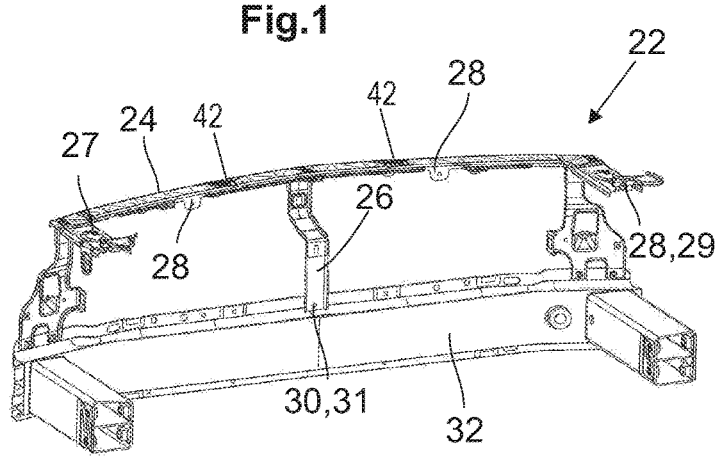
FIG. 2 shows an exemplary embodiment of a support structure according to the present disclosure by way of a perspective representation.

The deformable member 24 includes a hood buffer 27 for cushioning the energy that has to be absorbed when the engine hood is slammed, and a number of first fastening points 28, with which the support structure 22 can be fastened to the panel components 12 and/or to other components of a body of a vehicle which is not shown here. In the shown example, the support structure 22 is connected to load-bearing parts of the body with the fastening points 28 arranged on the free ends 29 of the deformable member 24, while the support structure 22 with the remaining fastening points 28 is connected to the panel components 12. The deformable member (24) comprises regions with reduced resistance moments and the regions with reduced resistance moments comprise tapers, holes and/or notches (42) (FIG. 2).

The support member 26 includes a distal end 30, where one or more second fastening points 31 are located, with which the support member 26 is fastened to a cross member 32 of the body of the vehicle. The support member 26 includes a region 34 with reduced resistance moment. Between the panel components 12 and the support member 26 an intermediate member 36 is arranged. Both the support member 26 and also the intermediate portion 36 are described in more detail in the following.

In FIGS. 3A-C, three exemplary embodiments of the support structure $22_1$, $22_2$, $22_3$ according to the present disclosure are illustrated in the form of extracts. In all three exemplary embodiments, the support members 26 include the region 34 with reduced resistance moment. In FIG. 3A, the region 34 with reduced resistance moment is realized by means of a whole 38, here an elongated hole. In FIG. 3B the region 34 with reduced resistance moment is realized by means of a taper 40. In FIG. 3C, the region 34 with reduced resistance moment is realized by means of a notch 42. The region with reduced resistance moment 34 causes the support member 26 to have a reduced strength in this region 34 than outside this region 34, so that it is more rapidly and greatly deformed in this region 34 than outside of this.

In FIG. 4A, a first exemplary embodiment 36 and in FIG. 4B a second exemplary embodiment $36_2$ of the intermediate member 36 according to the present disclosure is shown in each case by way of a perspective representation. The intermediate member 36 includes a number of ribs 44, in this case four ribs 44, which have a triangular shape in cross section. The intermediate member 36 includes a first portion $A_1$, which in the installed state faces the panel components 12, and a second portion $A_2$, which in the installed state faces the support structure 22 (see also FIG. 1). The first portion $A_1$ in this case is larger than the second portion $A_2$. The second exemplary embodiment $36_2$ of the intermediate member 36 according to the present disclosure shown in FIG. 4B includes a protrusion 46, which in the installed state engages in the hole 38 of the support member 26 (see FIG. 3A). In the installed state, the protrusion 46 can be alternatively arranged also spaced from the hole 38 so that the protrusion 46 only engages in the hole 38 when the panel components 12 during an impact are shifted towards the support structure 22.

In the case of an impact of a pedestrian, mainly the bumper 14 and the radiator grille 18 with the marque badge 20 are shifted towards the support structure 22. In the shown exemplary embodiment, the marque badge 20 is arranged so that it enters into contact with the intermediate member 36 as a consequence of an impact (see FIG. 1). The movements of the radiator grille 18 and of the marque badge 20 are consequently transmitted to the support member 26 via the intermediate member 36. In this case, the intermediate member 36 enters into interaction with the support, member 26 in the region 34 with reduced resistance moment, so that a relatively minor energy is sufficient in order to deform the support member 26. The support member 26 is deformed first and mainly in the region with reduced resistance moment, while the support member 26 outside this region is not deformed or to a significantly lower degree. Provided that additional energy is applied to the panel components 12 during the impact, the same is absorbed by the deformable member 24 and converted into deformation energy by way of deformation. The intermediate member 36 and the marque badge 20 can also be combined into a component.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A panel arrangement for a vehicle having a cross member, the panel arrangement comprising:
    at least one panel component;
    a support structure including a deformable member having first fastening points configured to connect the support structure to the at least one panel component and to the cross member, and at least one support member connected to the deformable member having second fastening points configured to fasten the support member to the cross member, the at least one support member including a region with a reduced resistance moment that is an elongated hole; and
    an intermediate member arranged between the at least one panel component and the support structure, the intermediate member interacts with the at least one panel component and the support structure when the at least one panel component shifts in the direction of the support structure to deform the support structure,
    wherein the intermediate member includes a protrusion that engages the elongated hole of the at least one support member.

2. The panel arrangement according to claim 1, wherein the deformable member comprises a region with a reduced resistance moment.

3. The panel arrangement according to claim 2, wherein the deformable member in the region with the reduced resistance moment comprises a notch.

4. The panel arrangement according to claim 1, wherein the support member extends perpendicularly to the deformable member.

5. A panel arrangement for covering a vehicle having a cross member comprising:
    at least one panel component;
    a support structure including a deformable member having first fastening points connecting the support structure to the at least one panel component and configured to connect to the cross member, and at least one support member connected to the deformable member having second fastening points configured to fasten the support member to the cross member, the at least one support member including a region with a reduced resistance moment that is an elongated hole; and
    an intermediate member arranged between the at least one panel component and the support structure, wherein the intermediate member interacts with the at least one panel component and the support structure when the at least one panel component shifts in the direction of the support structure to deform the support structure, the intermediate member including a first portion opposite a second portion and the first portion faces the at least one panel component and the second portion faces the support structure,
    wherein the second portion of the intermediate member includes a protrusion that engages the elongated hole of the at least one support member.

6. The panel arrangement according to claim 5, wherein the deformable member has a region with a reduced resistance moment, and the intermediate member interacts with the region with reduced resistance moment when the at least one panel component shifts in the direction of the support structure to deform the support structure.

7. The panel arrangement according to claim 6, wherein the first portion is larger than the second portion.

8. The panel arrangement according to claim 7, wherein the intermediate member comprises a plurality of ribs that extend outwardly from the intermediate member between the first portion and the second portion.

9. The panel arrangement according to claim 8, wherein at least one of the plurality of ribs have a triangular shape in cross section.

10. The panel arrangement according to claim 5, wherein the at least one panel component comprises at least one of an engine hood, a radiator grille, a bumper and a marque badge.

11. The panel arrangement according to claim 10, wherein the intermediate member is arranged to interact with the at least one panel component during the shifting thereof.

12. The panel arrangement according to claim 10, wherein the at least one panel component is the marque badge.

13. The panel arrangement according to claim 12, wherein the intermediate member and the marque badge are combined into an integrated component.

14. A vehicle, comprising:
a body having a cross member and a panel arrangement, the panel arrangement including:
at least one panel component;
a support structure including a deformable member having first fastening points connecting the support structure to the at least one panel component, and at least one support member connected to the deformable member having second fastening points to fasten the support member to the cross member, the at least one support member including a region with a reduced resistance moment that is an elongated hole; and
an intermediate member arranged between the at least one panel component and the support structure, the intermediate member interacts with the at least one panel component and the support structure when the at least one panel component shifts in the direction of the support structure to deform the support structure, the intermediate member including a first portion opposite a second portion and a plurality of ribs that extend outwardly from the intermediate member between the first portion and the second portion, the first portion faces the at least one panel component and the second portion faces the support structure, and the second portion includes a protrusion that engages the elongated hole of the at least one support member,
wherein the at least one panel component includes a radiator grille with a marque badge, and the marque badge contacts the intermediate member during an impact.

* * * * *